(12) United States Patent
Lawrence et al.

(10) Patent No.: US 7,454,309 B2
(45) Date of Patent: Nov. 18, 2008

(54) FOOT ACTIVATED USER INTERFACE

(75) Inventors: Richard Anthony Lawrence, Chipping Sodbury (GB); David Neil Slatter, Bristol (GB); Glenn Peter Hall, Stroud (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 311 days.

(21) Appl. No.: 11/156,629

(22) Filed: Jun. 21, 2005

(65) Prior Publication Data

US 2006/0003839 A1    Jan. 5, 2006

Related U.S. Application Data

(63) Continuation-in-part of application No. 10/098,293, filed on Mar. 18, 2002, now Pat. No. 6,922,184.

(30) Foreign Application Priority Data

Jun. 4, 2001   (GB)   ................... 0113561.5

(51) Int. Cl.
*G01C 22/00* (2006.01)
*G09G 5/00* (2006.01)

(52) U.S. Cl. ................ 702/160; 345/157; 345/163; 345/169; 345/629; 702/150

(58) Field of Classification Search ......... 345/155–164, 345/629, 169; 600/300; 341/22; 708/139; 361/181; 707/501; 702/160, 150; 73/49.3
See application file for complete search history.

(56) References Cited

U.S. PATENT DOCUMENTS

| | | | |
|---|---|---|---|
| 4,787,501 | A |   | 11/1988 | Rassmann et al. |
| 4,945,305 | A |   | 7/1990 | Blood |
| 5,373,651 | A |   | 12/1994 | Wood |
| 5,578,813 | A |   | 11/1996 | Allen et al. |
| 5,781,913 | A |   | 7/1998 | Felsenstein et al. |
| 5,838,305 | A |   | 11/1998 | Bookstein |
| 5,864,333 | A |   | 1/1999 | O'Heir |
| 5,886,685 | A |   | 3/1999 | Best |
| 5,907,318 | A |   | 5/1999 | Medina |
| 6,041,646 | A | * | 3/2000 | Fenlon ............. 73/49.3 |
| 6,167,413 | A |   | 12/2000 | Daley |
| 6,400,996 | B1 |   | 6/2002 | Hoffberg et al. |
| 6,527,711 | B1 |   | 3/2003 | Stivoric et al. |
| 6,594,617 | B2 | * | 7/2003 | Scherzinger ............. 702/160 |
| 6,600,477 | B1 |   | 7/2003 | Howell |
| 6,748,316 | B2 |   | 6/2004 | Takayama et al. |
| 2002/0024675 | A1 |   | 2/2002 | Foxlin |
| 2002/0030661 | A1 |   | 3/2002 | Gemunder et al. |
| 2002/0044152 | A1 |   | 4/2002 | Abbott et al. |

(Continued)

OTHER PUBLICATIONS

Agilent Technologies, "Optical Mouse Points to the Future," May 3, 2001, 3 pages, 2000-2001 Agilent Technologies.

(Continued)

*Primary Examiner*—John Barlow
*Assistant Examiner*—John Le

(57) ABSTRACT

A wearable computing apparatus includes a processor; a device for presenting information from the processor to a user, and a device for providing user input to the processor in response to the information presented to the user. The device is adapted to be activated wholly or partly by a foot of the user.

17 Claims, 4 Drawing Sheets

U.S. PATENT DOCUMENTS

2002/0105446 A1    8/2002    Mehring
2003/0171190 A1    9/2003    Rice

OTHER PUBLICATIONS

Agilent Technologies, "Agilent ADNS-2030 Optical Mouse Sensor," Product Overview, Agilent Technologies Inc., 2000, 4 Sheets.

DE01300-001, Data Sheet, MicroGyro, MG1101, RevA, Consumer Grade Dual Gyroscope with Digital Output, 2005, pp. 1-18, www.gyration.com.

Shenck et al., "Energy Scavenging with Shoe-Mounted Piezoelectric," IEEE, vol. 21, No. 3, May-Jun. 2001, 9 Sheets.

* cited by examiner

FOOT ACTIVATED USER INTERFACE

FIELD OF INVENTION

The present invention relates to a user interface for a computing device, and is particularly relevant to wearable computing devices.

PRIOR ART

The most conventional user interface for a computing device is a combination of a keyboard and a pointing device, such as a mouse. This is an extremely appropriate combination for use on a desktop, either for a desktop personal computer or for a notebook computer used on a desktop. For other types of device, other user interfaces are more attractive. For a personal digital assistant (PDA), keyboards are used but a pen-based interface with handwriting recognition is a popular alternative. Speech recognition is a further alternative user interface. However, in other user contexts, none of these conventional user interfaces are wholly satisfactory. One such environment is wearable computing, particularly where it is desired that the computing device is unobtrusive and does not inhibit normal user interaction. Another such environment is while the user is performing a complex task requiring use of his or her hands and perhaps also voice, and is using the computing device for reference or technical support (for example, in aircraft maintenance). It is desirable to provide user interfaces for computing devices which are advantageous over the conventional alternatives for non-standard user environments.

SUMMARY OF INVENTION

Accordingly, the invention provides wearable computing apparatus, comprising: a processor; a device for presenting information from the processor to a user; and a device for providing user input to the processor in response to the information presented to the user, wherein the device is adapted to be activated wholly or partly by a foot of the user.

It is known to provide foot controls for desktop computers—either by adaptation of a conventional mouse (as described in U.S. Pat. No. 5,886,685), or by provision of a mouse adapted to be moved by the foot and wired to the desktop computer (the "NoHands Mouse" produced by Hunter Digital of 11999 San Vicente Blvd., Suite 440, Los Angeles, Calif. 90049). Use of foot pedals is also well known in the context of conventional word processing (often to start or stop dictation machines). However, none of the prior art solutions is adapted to a wearable computer, as opposed to a desktop computer provided with a fixed arrangement of peripherals.

Preferably, the user input device is adapted to select an item from a displayed list, or a point or an area from a displayed area, or an item from an audible list.

It is particularly preferred for the user input device to comprise a foot mounted position sensor, whereby translation of the position sensor with respect to a reference unit (which may be worn by the user—for example, on a user's belt) is measured as relative motion by the processor. This can be translated into relative motion across a display (either in one or two dimensions—optionally, only an appropriate dimension of the position sensor translation is measured). Selection may be achieved by translation in another dimension (eg vertically) or by another means. Preferably, the position sensor is also an orientation sensor, in which case selection or any other predetermined action (button press) can be carried out by rotation of the foot control unit beyond a threshold value.

In a further aspect, the invention provides computing apparatus, comprising: a processor; a display for presenting information from the processor to a user; and a user input device comprising a foot mounted position and orientation sensor, wherein translation of the foot mounted position sensor causes translation of a selection device across the display and rotation of the foot mounted position sensor causes a predetermined operation to be carried out by the processor in respect of information indicated by the selection device.

DESCRIPTION OF PREFERRED EMBODIMENTS

Specific embodiments of the present invention will now be described by way of example.

Figure 1:
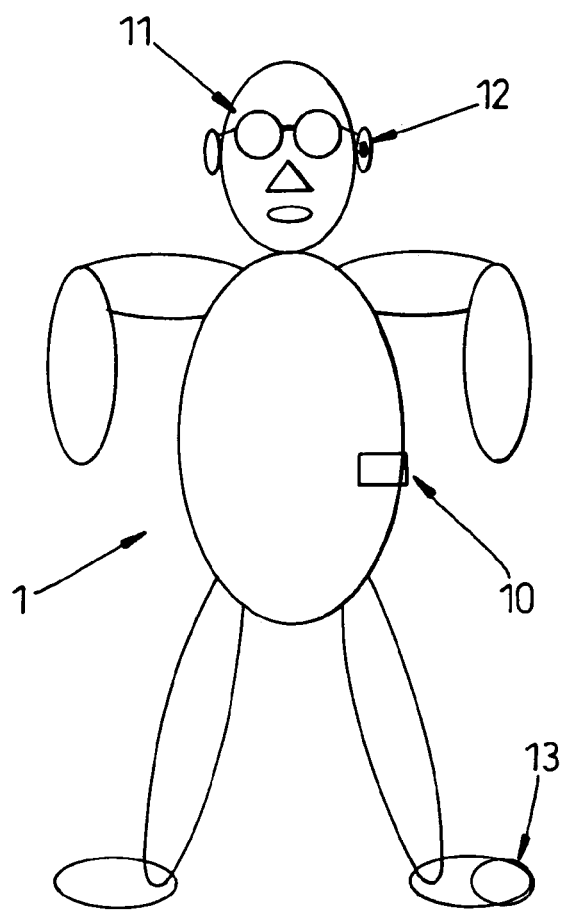
FIG. 1 shows a schematic representation of a user wearing a computing apparatus in accordance with embodiments of the present invention.
Figure 2:
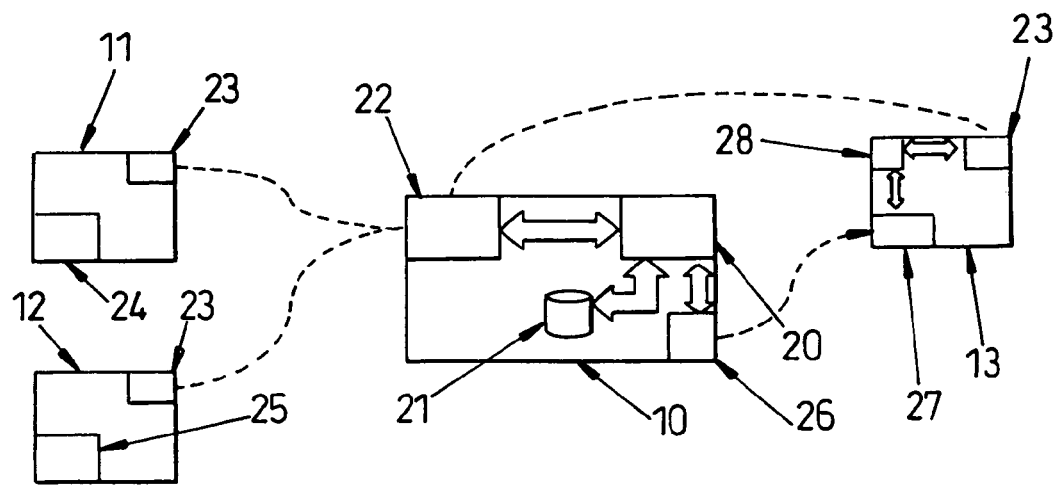
FIG. 2 shows a schematic diagram of the main functional elements of the computing apparatus of FIG. 1.

FIG. 1 shows a stylised representation of a user wearing a wearable computing apparatus according to an embodiment of the invention, and FIG. 2 shows the main functional elements of this apparatus. The processor 20 is contained within a processor unit 10, in this case worn on the body of the user (for example, mounted on a belt). Also contained in the processor unit 10 are a memory 21 and a communications control unit 22. Also contained within the processor unit 10, but not shown, will be such circuitry as is necessary to control or interact with the other system elements (such circuitry may include, for example, a video driver for a display)—the skilled person will readily appreciate what circuitry would be necessary for each such system element.

The wearable computing apparatus also comprises two separate devices for presenting information to a user. One of these elements is eyeglass display unit 11, comprising a communications unit 23 and a microdisplay 24. A variety of types of microdisplays are known—generally these occupy only a small part of the user's visual field, but by means of appropriate optical elements provide displayed information which appears to be of larger size but further away from the user. Appropriate microdisplays are known, and are commercially available from, for example: Colorado Microdisplay Inc. of 2477 55$^{th}$ Street, Boulder, Colo., 80301 USA; Displaytech, Inc. of 2602 Clover Basin Drive, Longmont, Colo. 80503-7603 USA; Displaywear Inc. of 831A Bransten Road, San Carlos, Calif. 94070 USA; and Tekgear Inc. of 1-90 Market Avenue, Winnipeg, Manitoba R3B 0PS Canada. The other information presenting element is an earpiece unit 12 containing a communications unit 23 and a speaker unit 25.

Information can be provided to the user through the speaker unit 25 in the form of simulated speech created by appropriate software routines. Such speech synthesizers are known, examples including the following: Bell Labs Text to Speech Synthesis, provided by Lucent Technologies; and the Festival Speech Synthesis System of the University of Edinburgh. Speech synthesis would most logically be carried out at the main processor 20, but with digital to analogue conversion at the speaker unit 25. It will be understood that the eyeglass display unit 11 and the earpiece unit 12 will contain other components necessary to the normal function of such units: for example, the eyeglass display unit will typically contain a power source and a processor and may contain a video controller (if this is not present in the processor unit 12) and the earpiece unit 12 will typically contain a power source, a processor and a digital to analogue converter.

Different forms of communications units 22,23 can be employed in accordance with conventional or other approaches for connecting peripheral units with a main processor. A particularly appropriate approach for wearable computing apparatus is to use a short range wireless networking protocol such as Bluetooth (the Bluetooth specification is determined by the Bluetooth Special Interest Group). In this case, communications control unit 22 may be a Bluetooth master unit and communications units 23 may be Bluetooth slave units.

Foot control unit 13 and its interaction with the main processor 20 will now be described with reference to FIGS. 2 and 3. In a preferred embodiment, the foot control unit is an electromagnetic position sensor, such as those produced by Ascension Technology Corporation of PO Box 527, Burlington, Vt. 05402 USA (products such as Flock of Birds and Motion Star). Such products are typically used for motion tracking (for example, in recording movement of actors for subsequent animation). Sensor systems such as Flock of Birds operate by measuring position and orientation of one or more receiving antenna sensors with respect to a transmitting antenna, normally fixed in space. The transmitting antenna is driven by a pulsed DC signal. The receiving antenna measures the transmitted magnetic field pulse and the earth's magnetic field, with a microprocessor controlling transmitting and receiving elements and converting received signals into position and orientation inputs. An example of such a system is described in U.S. Pat. No. 4,945,305, which teaches a sensor adapted to return a position and orientation relative to a transmitter position. Numerous further such sensors, operating according to similar or different signalling regimes (such as AC electromagnetic and optical regimes) are available and could be employed for the present purpose by the person skilled in the art. The skilled person will appreciate from the above references how to acquire or construct such a sensor. Alternative forms of sensor (for example, an optical sensor adapted to determine navigation across an arbitrary surface by recognition of variation in the surface, as discussed in the applicants' U.S. Pat. No. 5,578,813) can be employed in other embodiments of the invention—some such alternative embodiments are described further below.

When such DC-pulsed electromagnetic sensors are used for motion tracking, it is normal to fix the transmitting antenna in space. For embodiments of the present invention, there is no reason to do this as only relative motion is required (as is the case for a conventional tracking device such as a mouse) and it is effective to mount the transmitter unit 26 with the main processor 20. A suitable alternative would be to mount the transmitter unit 26 on the user's other foot—in that way, motion would be completely under the user's control, and the proximity of transmitter unit 26 and receiving unit 27 could allow use of lower power signals, reducing power demand on the computing apparatus as a whole. A transmitting antenna of transmitter unit 26 provides a signal received by receiving antenna of receiving unit 27 of foot control unit 13. A processor 28 of the foot control unit calculates the relative position and orientation of the receiving unit 27 relative to the transmitter unit 26 (or alternatively, simply collects data from the receiving unit 27 for subsequent calculation by the main processor 20) after compensation for the earth's magnetic field and returns relevant data to the main processor through communications unit 23. The main processor 20 is therefore able to calculate change in relative position and orientation of the receiving unit 27 relative to the transmitter unit 26 over time, as a stream of signals from the transmitter unit 26 leads to receipt of a stream of position and orientation signals from the receiving unit.

Figure 3:
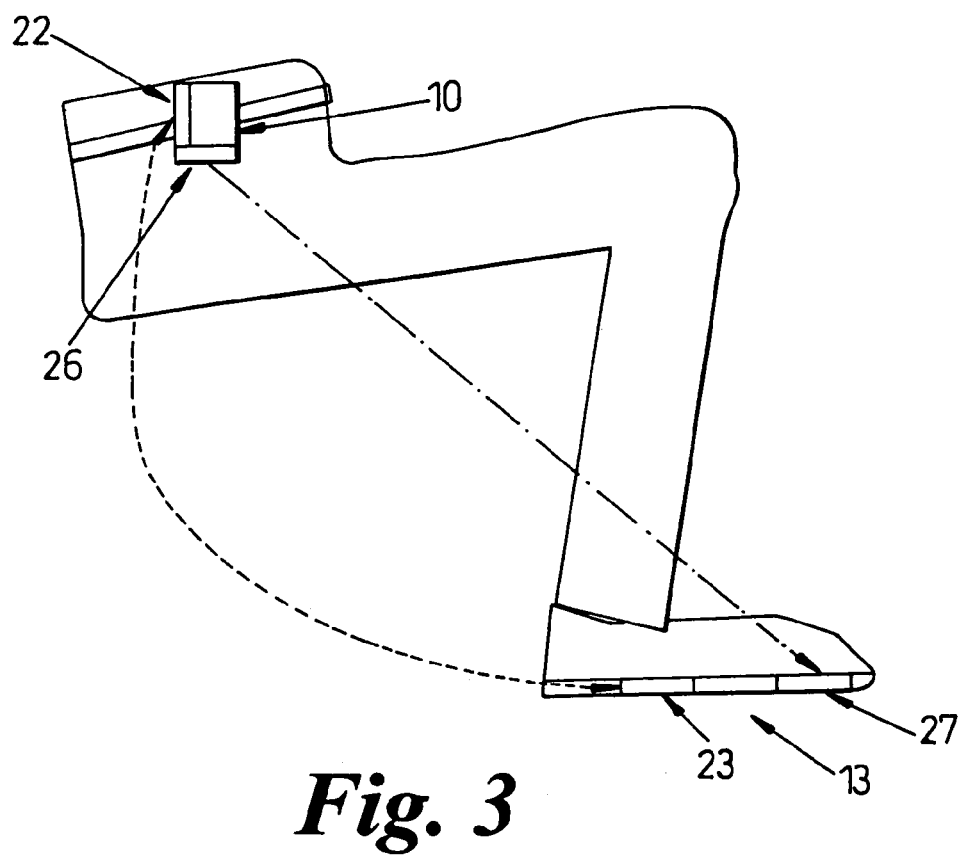
FIG. 3 indicates the methods of communication between a processor unit and a foot control unit for the computing device of FIG. 1.

While FIG. 3 shows operation of such a foot control unit 13 with the user in a sitting position, there is no constraint on the user to adopt any particular position—a foot control unit 13 of this type could equally well be used with the user in a standing position. While it will generally be more convenient for the user to be able to place one or both feet on the ground when using such a foot control unit 13, even this is not essential.

Figure 4:
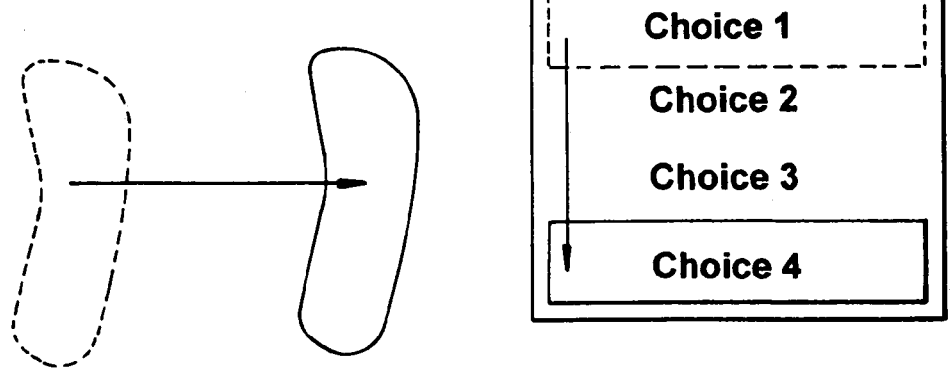
FIG. 4 indicates use of a foot control unit according to an embodiment of the invention to select from a one-dimensional list.

Relative motion determined from position signals can be used as a method of obtaining user input in essentially the same manner as for translational motion of a conventional mouse. For selection from a one-dimensional list (as may be required in a visual interface or an audible interface), only one dimension of position need be used to indicate the item to be selected—for example, foot motion left or right in a horizontal plane (x-axis), but not vertical motion (z-axis) or motion up and down (y-axis) in the horizontal plane (see FIG. 4 for the case of a visual display—for an audible interface translational movement can cycle through a list of options in a similar manner). To select an item (rather than merely "point" to it) one of the other dimensions could be used—for example, a significant y-axis motion could indicate "selection" at that x-axis position. A further possibility is to use orientation information (as will be discussed below for two-dimensional selection) or to use a separate mechanism, such as a hand-activated button, for actual selection.

Figure 5A:
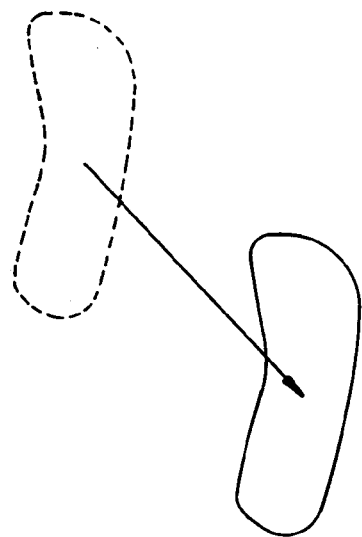
FIGS. 5A and 5B indicates use of a foot control unit according to an embodiment of the invention to position a pointer within an area and select an item at the pointer position.
Figure 5A:
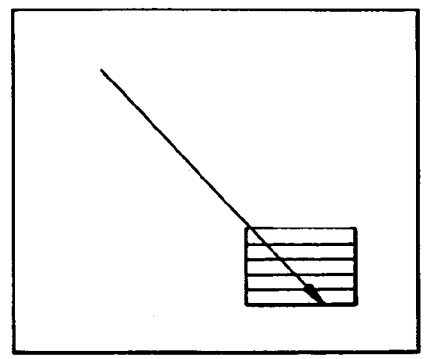
Figure 5B:
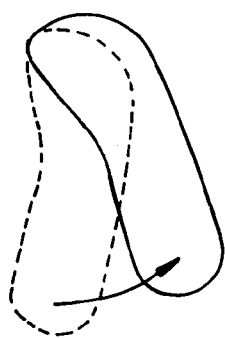
Figure 5B:
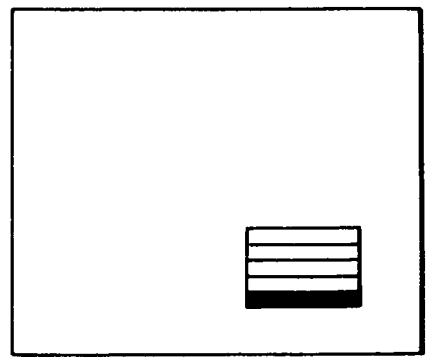

Two-dimensional selection can operate in very much the same manner as a conventional mouse (and would be the normal approach to use for a visual interface). In this case, motion of the foot anywhere in the horizontal plane would translate to motion in that plane in essentially the same manner as a conventional mouse. One possibility for selection may be to use the vertical dimension (lift the foot off the ground, or tap the toe or heel)—however, more positional accuracy may be provided by use of the orientation sensors, and detecting rotation of the foot (for example, an anticlockwise rotation of the foot by 30 degrees or more could indicate a right click and a similar clockwise rotation a left click for an equivalent mouse)—rotation about the toe is likely to lead to greater positional accuracy than rotation around the heel. FIG. 5A shows an example of translation of the user's foot to translate a pointing device and so indicate an item for selection, and FIG. 5B shows the act of selection by rotation of the user's foot. Further features of a conventional mouse in conventional operating systems, such as selecting an area, can be replicated in much the same way as for a conventional mouse by dragging the foot across the ground in a "left-clicked" or "right-clicked" foot position. A preferred use for movement in the z-direction is to allow repositioning of the foot without "dragging" the selection device (in the same manner as lifting and replacing a conventional mouse)—however, an issue associated with this is to ensure that the foot control unit "knows" when to restart translational motion of the pointing device. One approach would be disable translational motion of the pointing device when relative motion in the z-direction exceeds a predetermined value, and to re-enable the translational motion of the pointing device on a "click"—such as a rotation of the foot and hence the foot control unit above a threshold value. The user could then reposition his or her foot and rotate it to re-activate the tracking action—this allows the user to use the mouse in a preferred area of greatest sensitivity, or on a particularly suitable surface.

A foot control unit as described above can be used effectively in a range of otherwise difficult user contexts. If the computing apparatus is intended not to affect normal user movement and interaction, use of the foot (which plays no part in normal user interaction) can allow free use of normal person-to-person communication by means of voice, facial gesture or manual gesture. If the computing apparatus is to provide technical support for a user conducting an engineering task, use of the foot for user interface control allows the user full use of hands and senses where not occupied by the presentation of information to the user.

A "foot mouse" of the type described above operates according to relative motion between the foot control unit and a reference unit. The reference unit will be worn by the user for wearable computer apparatus, but may be retained on the desktop (as for a normal peripheral) or may be mounted within a notebook computer. A pointing and selecting device of this type may be advantageous not only for a wearable computing apparatus, but also for a conventional desktop computer. As a foot control unit of this type can be worn by, rather than simply operated by, a user's foot, there is greater potential for more rapid and natural use.

Embodiments of wearable computing apparatus in accordance with aspects of the invention can be achieved with alternative designs of "foot mouse". Two such further embodiments, based on optical mouse technology and on accelerometer technology, are discussed below.

Figure 6:
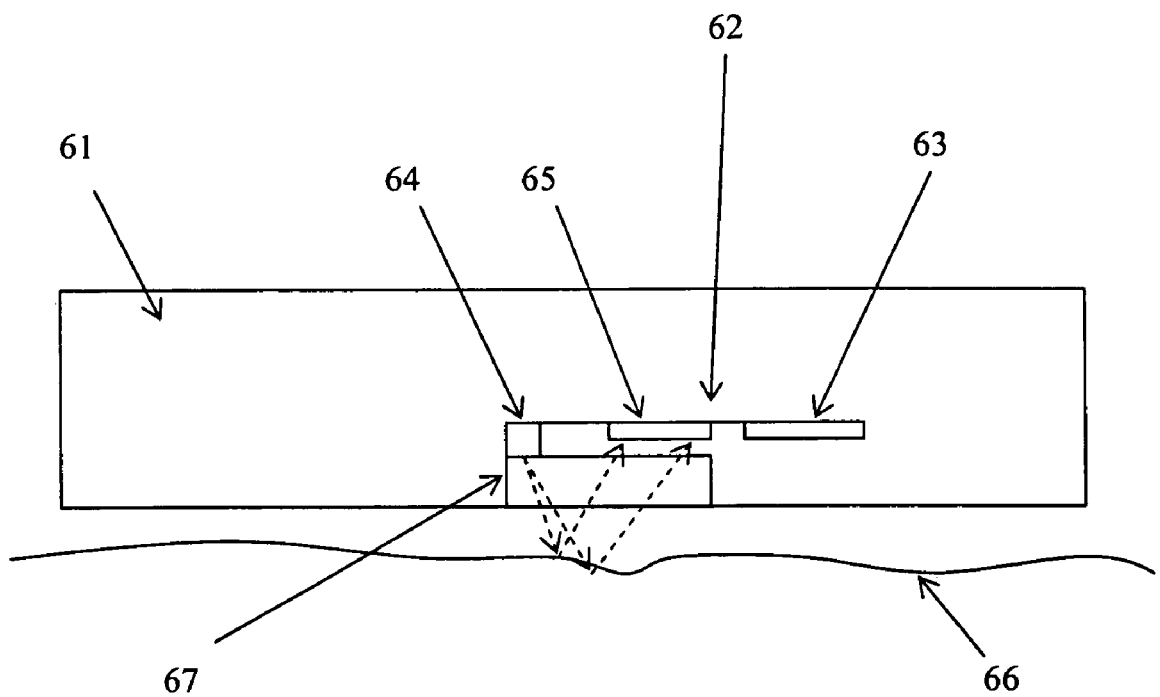
FIG. 6 indicates a foot control unit according to a further embodiment of the invention.

An embodiment using an optical mouse technology foot control unit is shown in FIG. 6, with reference also being made to FIGS. 1 and 2. The components of the wearable computer shown in FIGS. 1 and 2 other than foot control unit 13 are essentially as described above, the one difference being that processor unit 10 does not serve as a reference for foot control unit 13—signals received from the foot control unit are converted directly into display positions.

FIG. 6 shows the foot control unit itself mounted within a shoe 61. A window 67 formed of synthetic diamond or similar robust and scratch-resistant material is provided in the shoe 61. Behind the window is a sensor assembly 62.

The sensor assembly 62 may comprise a sensor such as those available in the range of Optical Navigation products provided by Agilent Technologies, Inc—these products include complete sensor, lens and ASIC bundles suitable for integration into a foot control design of this type. The sensor comprises a light source 64 such as a laser or an LED, which illuminates the area of an underlying surface 66 through the window, the imaging element 65 of the sensor (for example, a 16×16 CMOS pixel grid) capturing the reflected image a large number of times per second and providing this to an integrated circuit 63. The patterns provided by the texture of the surface 66 underneath the window can be sensed and their translation measured between images, this translation being converted into signals useful for translation of the cursor on the display. An exemplary sensor of this type optimised for cordless mouse applications is the ADNS-2030 of Agilent Technologies, Inc.

As before, a mechanism is required to provide a selection event at the foot control unit 13. Simplest integration with existing optical mouse technology might be provided by use of an actual button press within the shoe (for example, activated by a user's toe). Alternatively, any of the mechanisms provided above for use with the relative position foot control unit could be used—particularly use of a second axis for selection from a one-dimensional list and foot rotation to indicate a left or right click. This could be done with appropriate programming either at the foot control unit 13 or at the processor unit 10 receiving the data stream from the foot control unit 13.

An embodiment using an accelerometer foot control unit will now be described. The components of the wearable computer shown in FIGS. 1 and 2 other than foot control unit 13 are again essentially as described above, the difference being as before that processor unit 10 does not serve as a reference for foot control unit 13, with signals received from the foot control unit are converted directly into display positions. The sensor in the foot control unit is however not a relative position sensor but an accelerometer (use of accelerometers in computer mice is described in, for example, U.S. Pat. No. 4,787,051) or a gyroscopic sensor, such as that used in the Gyration Ultra Cordless Optical Mouse produced by Gyration, Inc. (for example, the Gyration MG1101), which allows motion of the foot control unit itself to be converted into a signal representative of the translation of the foot sensor itself. Such a foot control unit is closely analogous to the relative position sensor foot control unit described above—any of the mechanisms to provide a selection event suitable for use in the relative position sensor foot control unit are suitable for use with an accelerometer or gyroscopic foot control unit.

Where a foot control unit requires power, this could of course be provided by an appropriate battery. An alternative is for the foot control unit to be powered by the user, for example by a piezoelectric generator in the shoe (see N. S. Shenck, J. A. Paradiso, Energy scavenging with shoe-mounted piezoelectrics, IEEE Micro 21 (2001) 30-41).

Other foot control unit technologies could also be used. An XY stress detector mounted in a shoe could also be used to provide foot-controlled positional information. Microwave technology could be used instead of DC-pulsed electromagnetic sensor technology to achieve measurement of relative position. The skilled person will appreciate from the principles set out here which technologies will be appropriate to the intended purpose.

The invention claimed is:
1. Wearable computing apparatus, comprising:
a processor;
a device for presenting information from the processor to a user; and
a device for providing user input to the processor in response to the information presented to the user, wherein the user input device is adapted to be activated wholly or partly by a foot of the user,
wherein the user input device comprises a foot mounted position sensor, the foot mounted position sensor comprising a light source and a sensor adapted to measure position from light from the light source reflected by a surface adjacent to the foot mounted position sensor.
2. Apparatus as claimed in claim 1, wherein the device for presenting information to a user is a visible display.
3. Apparatus as claimed in claim 2, wherein the visible display is an eyeglass display.

4. Apparatus as claimed in claim 2, wherein the user input device is adapted to select an item from a list displayed on the visible display.

5. Apparatus as claimed in claim 2, wherein the user input device is adapted to select a point on an area displayed on the visible display.

6. Apparatus as claimed in claim 2, wherein the user input device is adapted to select an arbitrary area from an area displayed on the visible display.

7. Apparatus as claimed in claim 1, wherein the device for presenting information to a user provides audible output.

8. Apparatus as claimed in claim 7, wherein the user input device is adapted to allow selection from menu options.

9. Apparatus as claimed in claim 1, wherein the user input device further comprises a reference unit for the position sensor, wherein the reference unit is also adapted to be worn by the user.

10. Apparatus as claimed in claim 1, wherein translation of the foot mounted position sensor causes translation of a selection device across a space presented by the information-presenting device.

11. Apparatus as claimed in claim 10, wherein the foot mounted position sensor is further adapted to sense orientation.

12. Apparatus as claimed in claim 11, wherein rotation of the foot mounted position sensor beyond a threshold value causes a predetermined operation to be carried out by the processor in respect of information indicated to be available for selection by the information-presenting device.

13. Computing apparatus, comprising:
a processor;
a display for presenting information from the processor to a user; and
a user input device comprising a foot mounted position and orientation sensor,
wherein translation of the foot mounted position and orientation sensor causes translation of a selection device across the display and rotation of the foot mounted position and orientation sensor causes a predetermined operation to be carried out by the processor in respect of information indicated by the selection device, and
wherein the foot mounted position and orientation sensor comprises a light source and a sensor adapted to measure position from light from the light source reflected by a surface adjacent to the foot mounted position sensor.

14. Computing apparatus as claimed in claim 13, wherein the processor, the display and the user input device are wearable by a user.

15. Computing apparatus as claimed in claim 13, wherein the user input device is adapted for selection of an item from a list displayed on the display.

16. Computing apparatus as claimed in claim 13, wherein the user input device is adapted for selection of a point on an area displayed on the display.

17. Computing apparatus as claimed in claim 13, wherein the user input device is adapted for selection of an arbitrary area from an area displayed on the display.

* * * * *

UNITED STATES PATENT AND TRADEMARK OFFICE
CERTIFICATE OF CORRECTION

PATENT NO.         : 7,454,309 B2                                    Page 1 of 1
APPLICATION NO.  : 11/156629
DATED              : November 18, 2008
INVENTOR(S)        : Richard Anthony Lawrence et al.

It is certified that error appears in the above-identified patent and that said Letters Patent is hereby corrected as shown below:

In column 1, line 2, above "FIELD OF INVENTION"
insert --        CROSS REFERENCE TO RELATED APPLICATION
This application is a continuation in part of U.S. application Ser. No. 10/098,293 filed Mar. 18, 2002, now Pat. No. 6,922,184. --.

Signed and Sealed this

Second Day of June, 2009

JOHN DOLL
*Acting Director of the United States Patent and Trademark Office*